Patented May 22, 1934

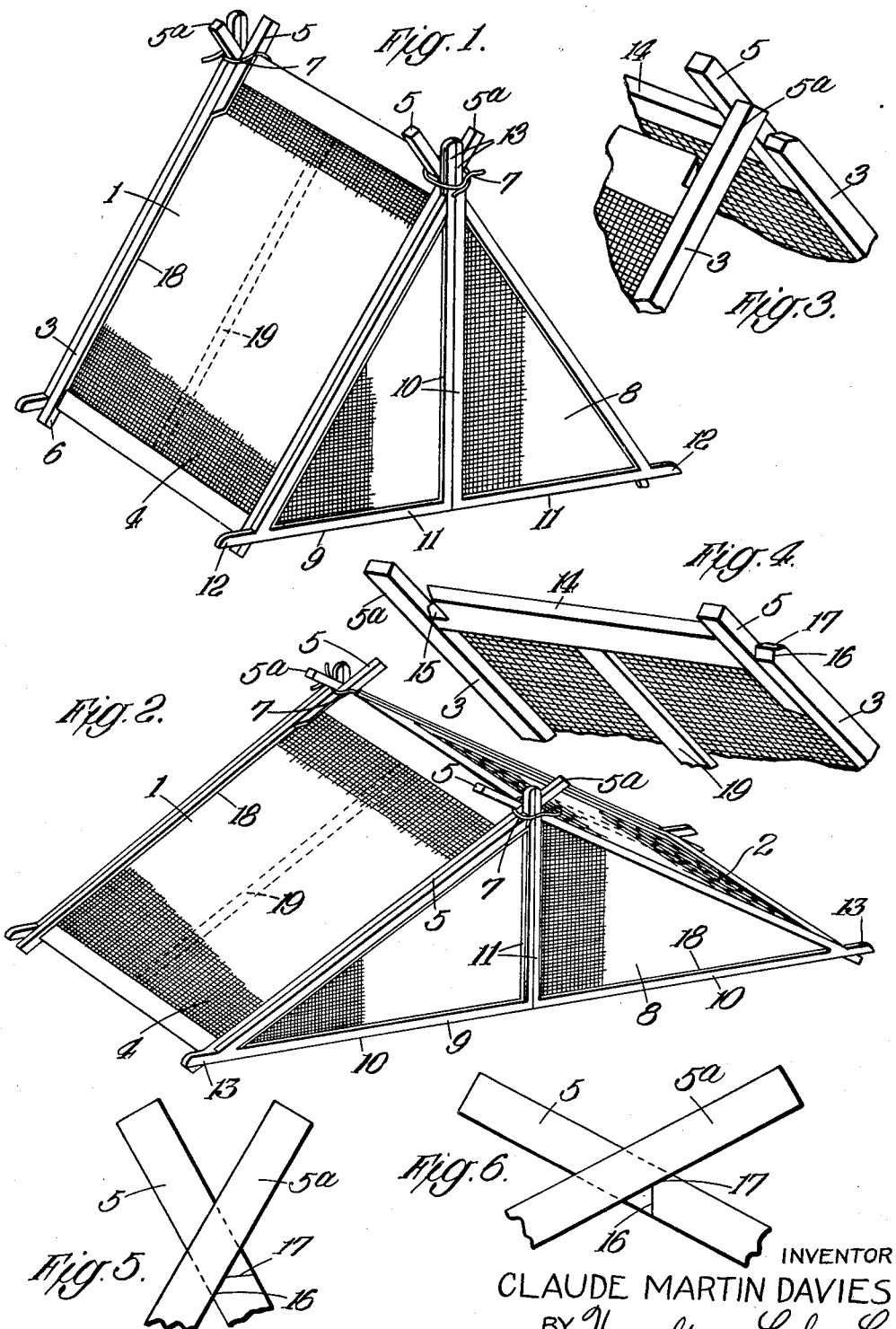

1,960,001

UNITED STATES PATENT OFFICE 1,960,001

SECTIONAL STRUCTURE

Claude Martin Davies, Harlow, England

Application October 24, 1933, Serial No. 694,991
In Great Britain January 4, 1933

3 Claims. (Cl. 47—26)

This invention relates to sectional structures such as greenhouses, horticultural frames, poultry houses and invalid shelters.

The chief object of the invention is to provide a sectional structure for the purposes specified, the sections or parts of which will be handy and relatively light in weight, and with which parts a sectional structure can be built up to the required size and shape to suit the particular purpose for which it is intended to be used. For example, by a suitable arrangement of the sections a greenhouse or similar structure may be built up which is either relatively low and wide or relatively high and narrow. By this arrangement the structure may either by made suitable for use in covering over small shrubs, seedlings, strawberry plants and the like, or for covering relatively tall plants or crops.

Referring to the drawing:—

Figure 1 is a perspective view of a sectional structure constructed according to the invention.

Figure 2 is a similar view illustrating an alternative form of sectional structure which can be built up by a rearrangement of the component parts.

Figures 3 to 6 are views illustrating constructional details.

In the construction shown by the drawing in which a sectional structure is illustrated in its simplest form, the sectional structure is built up from two rectangular side-lights 1 and 2 each consisting of a wooden or metal frame 3 which for the sake of lightness and portability are preferably glazed as at 4 with the material sold under the registered trade name of "Windolite", the two frame members being adapted to be connected together with their lower edges spaced apart, their upper edges being in abutting relationship, the structure being therefore of inverted V-shape when viewed from one end. The side-members of each frame are continued upwardly as at 5 and 5a and downwardly as at 6 to constitute projections or horns, the lower ones 6 of which enter the ground and the upper ones 5 and 5a serve for connecting the frame members together by means of a cord or string 7. One or both ends of the structure are closed by means of end-lights 8, each end-light consisting of a wooden or metal frame 9 in the form of a right-angled triangle, the sides 10 and 11 containing the right-angle being of different lengths. The end-lights are also preferably glazed with "Windolite" and are likewise provided with projections or horns 12, 12 and 13 which are continuations of the sides 9, 11 and 10, respectively. The projections or horns which are disposed uppermost serve for connecting the end-lights to the side-lights, the cord or string which is passed around the projections 5 and 5a on the side-lights also passing around the projections 13 on the end-lights.

By constructing the end-lights in the form of right-angled triangles, the sides of which are of different lengths, they may readily be reversed so as to form a structure which is relatively high and of relatively narrow width as shown in Figure 1, or a structure which is relatively wide and low as shown in Figure 2.

In order to render the structure as watertight as possible the adjacent abutting edges of the side-lights are preferably bevelled off as shown at 14 in Figure 4 so that they fit together closely at whatever angle the side-lights are disposed to each other. Furthermore, it is preferred that each of the side-lights shall be of an identical and interchangeable construction for manufacturing reasons. For this purpose, and also to enable the side-lights to fit together properly, one of the upstanding projections 5a of each side-light is formed as a continuation of the one side member of the frame, the projecting portion 5 on the opposite edge of the frame consisting of a separate member which is secured to the inner edge of the adjacent side member, as shown in Figures 3 and 4, so that when the two side-lights are placed together the projections on opposite frames are staggered in relation to each other. The upper edges of each side-light frame are cut away as at 15 to constitute an inclined face to engage the projection 5 on the opposite member, and furthermore, the side member on the opposite side of the frame is shaped to form two inclined surfaces 16 and 17 with which the projection 5a on the opposite frame member is adapted to engage respectively when the frame members occupy the positions and have the forms indicated in Figures 1 and 2. The relative positions of the projections 5 and 5a and the surfaces 16 and 17 are shown more clearly in the detail views shown by Figures 5 and 6.

The glazing material may be secured in position upon the frame members in any desired manner, but in order to render them as watertight as possible the edges are preferably protected by beading 18 which will facilitate the rain running off without entering the structure, whilst furthermore the glazing material on each side frame may be additionally supported by means of a batten 19 connecting the upper and lower members of each side-frame together.

By the use of the sections or parts hereinbefore described a greenhouse or like structure may be easily built up of any desired size by arranging several pairs of side-lights end to end, whilst in certain cases where greater height is desired the lower edges of the side and end-lights may rest upon low walls of concrete or other suitable material, and furthermore due to the fact that the parts are relatively light in weight, handy and easily assembled and dismantled the structure can be readily moved from one place to another.

Although as stated earlier in the specification the frame members are preferably glazed with "Windolite" they may nevertheless if desired be filled with any other transparent material such as glass or any opaque or semi-opaque material such as for example canvas.

What I claim and desire to secure by Letters Patent of the United States is:—

1. A sectional structure for the purposes specified comprising side-lights of rectangular shape having their lower edges spaced apart and their upper edges in abutting relationship, and consisting each of a frame glazed with transparent material, an end-light formed in two parts disposed in abutting relationship for closing the structure at one end, each of said parts being of triangular shape, the triangular parts of each end-light each consisting of a frame glazed with transparent material, upstanding projections on said frame members and a cord passed around said projections for connecting said side-lights and end-light together in a readily detachable manner.

2. A sectional structure for the purposes specified comprising side-lights of rectangular shape having their lower edges spaced apart and their upper edges in abutting relationship, and consisting each of a frame glazed with transparent material, an end-light formed in two abutting parts, each of said parts having the shape of a right-angled triangle, the sides containing the right-angles being of unequal length, the said parts being arranged in a position in which the right-angles are adjacent, the parts of each end-light each consisting of a frame glazed with transparent material, the parts constituting the end-light being reversible so that when in one position the longer of the sides containing the right-angle is disposed vertically, and in the other position the shorter of the sides containing the right-angle is disposed vertically, the abutting edges of the side-lights in the first case meeting at an acute angle and in the second case at an obtuse angle, upstanding projections on said side-lights, projections on said shorter and longer sides of the parts constituting said end-light, and a cord passed around the adjacent projections on said side and end-lights for connecting said side-lights and end-light together in a readily detachable manner.

3. A sectional structure for the purposes specified comprising interchangeable side-lights of rectangular shape having their lower edges spaced apart and their upper edges in abutting relationship, each side-light consisting of a frame glazed with transparent material, upstanding projections on said frame members arranged in staggered relationship, each frame member being cut away at its upper edge to receive the projections on the opposite frame member, said parts being cut away so that said frame members may fit together with their abutting edges forming an acute angle or with their abutting edges forming an obtuse angle, an end-light formed in two parts disposed in abutting relationship for closing the structure at one end, each part being of triangular shape, the parts constituting the end-light being reversible so that when in one position the longer of the sides containing the right-angle is disposed vertically and in the other position the shorter of the sides containing the right-angle is disposed vertically, the abutting edges of the side-lights in the first case meeting at an acute angle and in the second case at an obtuse angle, projections on said shorter and longer sides of the parts constituting said end-light, and a cord passed around adjacent projections on said side and end-lights for connecting said side-lights and end-light together in a readily detachable manner.

CLAUDE MARTIN DAVIES.